United States Patent
Geiger et al.

(10) Patent No.: US 12,496,849 B2
(45) Date of Patent: Dec. 16, 2025

(54) TIRE SUPPORT RIM FOR TRACK ROLLER ASSOCIATED WITH A FLANGE

(71) Applicant: ALSTOM Transport SA, Saint-Ouen-sur-Seine (FR)

(72) Inventors: Paul Geiger, Dachstein (FR); Dominique Bebon, Weyersheim (FR)

(73) Assignee: ALSTOM Transport SA, Saint-Ouen-sur-Seine (FR)

( * ) Notice: Subject to any disclaimer, the term of this patent is extended or adjusted under 35 U.S.C. 154(b) by 398 days.

(21) Appl. No.: 18/107,992

(22) Filed: Feb. 9, 2023

(65) Prior Publication Data

US 2023/0264515 A1   Aug. 24, 2023

(30) Foreign Application Priority Data

Feb. 15, 2022   (FR) ...................................... 2201322

(51) Int. Cl.
   *B60B 17/00* (2006.01)
(52) U.S. Cl.
   CPC ...... *B60B 17/0013* (2013.01); *B60B 17/0068* (2013.01); *B60B 2900/513* (2013.01)
(58) Field of Classification Search
   CPC ... B60B 17/00; B60B 17/001; B60B 17/0013; B60B 17/0068; B60B 17/0082; B60B 2900/513; B60B 19/10; B61F 9/00
   See application file for complete search history.

(56) References Cited

U.S. PATENT DOCUMENTS

| | | | | |
|---|---|---|---|---|
| 4,632,445 A | * | 12/1986 | Giesl-Gieslingen | B60B 19/10 295/1 |
| 6,375,243 B1 | * | 4/2002 | Bradley | B60B 19/10 295/1 |
| 8,146,512 B2 | * | 4/2012 | Andre | B61F 9/00 104/244 |
| 2005/0172851 A1 | | 8/2005 | Andre | |
| 2014/0306068 A1 | | 10/2014 | Andre | |

FOREIGN PATENT DOCUMENTS

| | | | | |
|---|---|---|---|---|
| DE | 202008012661 U1 | * | 3/2010 | ......... B60B 17/0006 |
| EP | 3760891 A1 | * | 1/2021 | ............. B60B 17/00 |
| WO | WO-9733100 A1 | * | 9/1997 | ......... B60B 17/0006 |
| WO | WO-2013061263 A1 | * | 5/2013 | ................. B61F 9/00 |

OTHER PUBLICATIONS

International Search Report dated Jul. 18, 2022.

* cited by examiner

*Primary Examiner* — Kip T Kotter
(74) *Attorney, Agent, or Firm* — IPSILON USA, LLP

(57) ABSTRACT

A tire support rim for track roller associated with a flange is provided with a circular tire (2), and a support rim (1) for an annular track roller producing a flange. The rim (1) defines a peripheral edge intended to bear a tire, a medial edge in contact with the medial portion of the roller, and two opposite faces producing, on the one hand, an open face and, on the other hand, a bearing face positioned against the surface of the flange of the roller. The rim (1) incorporates a cooling device having at least one circulation duct for air passing through the thickness of the rim from an orifice (51) of the open face such that the duct has a portion at the medial edge and a portion positioned radially on the bearing face between the medial and peripheral edges.

11 Claims, 3 Drawing Sheets

[Fig. 1]
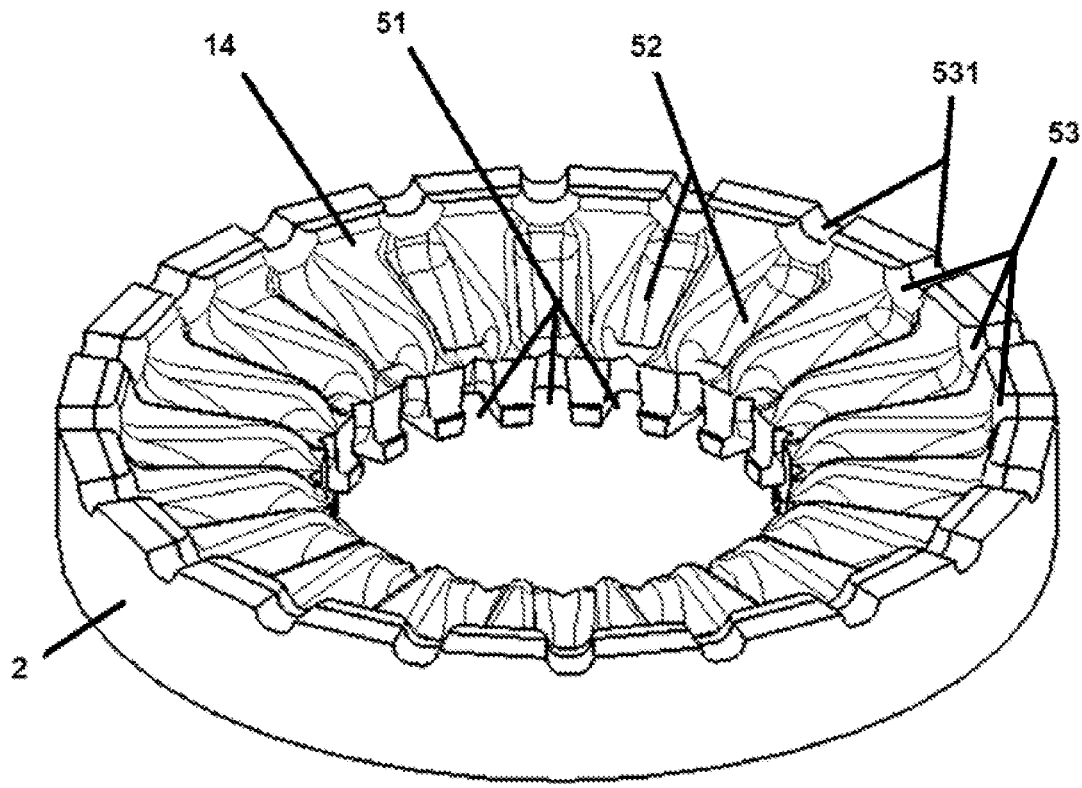
[Fig. 2]
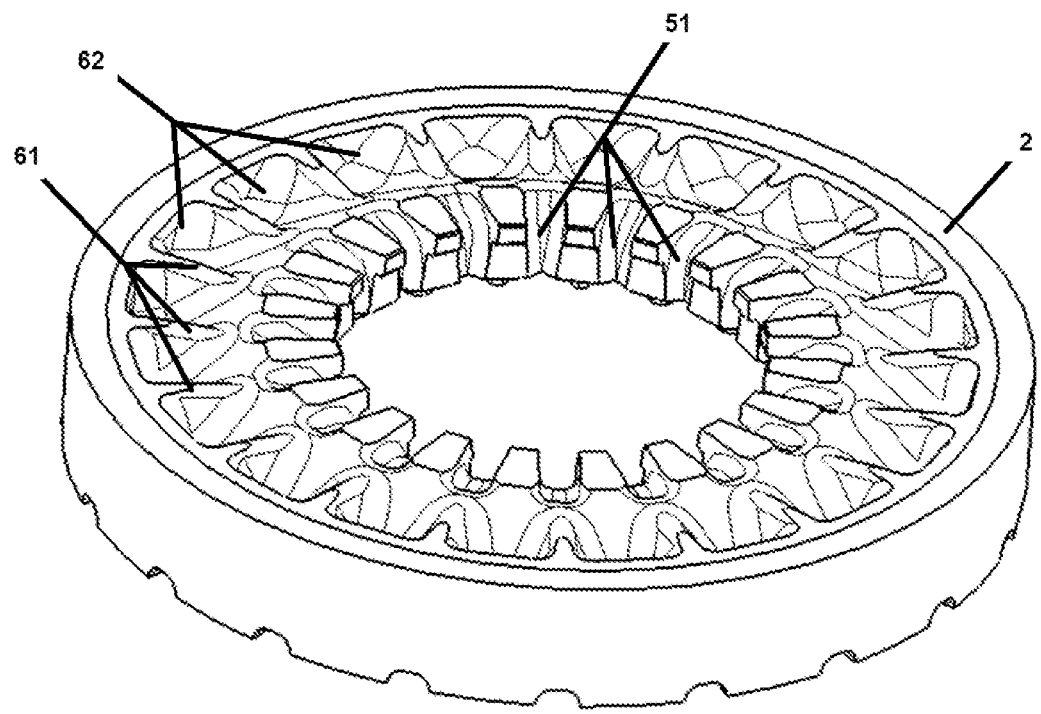

[Fig. 3]
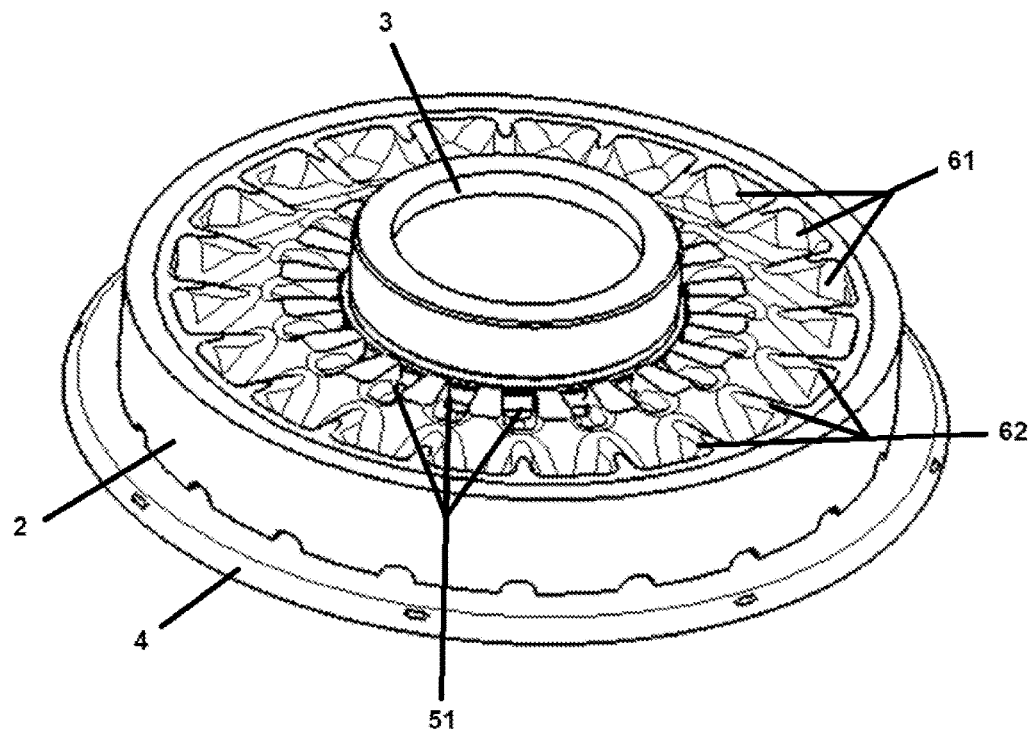
[Fig. 4]
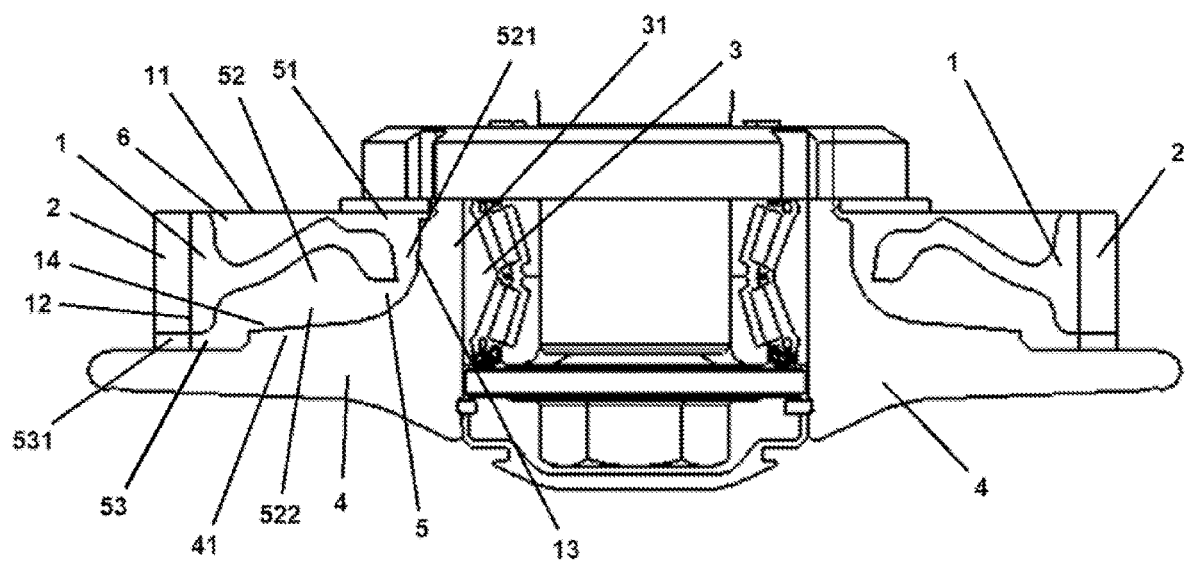

[Fig. 5]
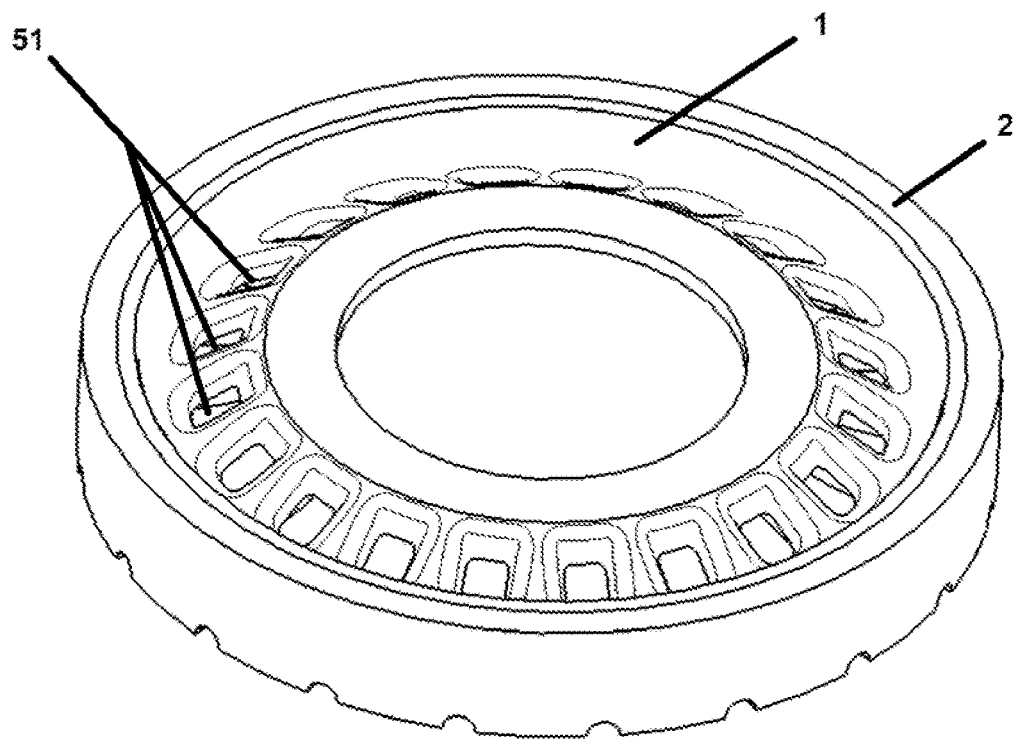
[Fig. 6]
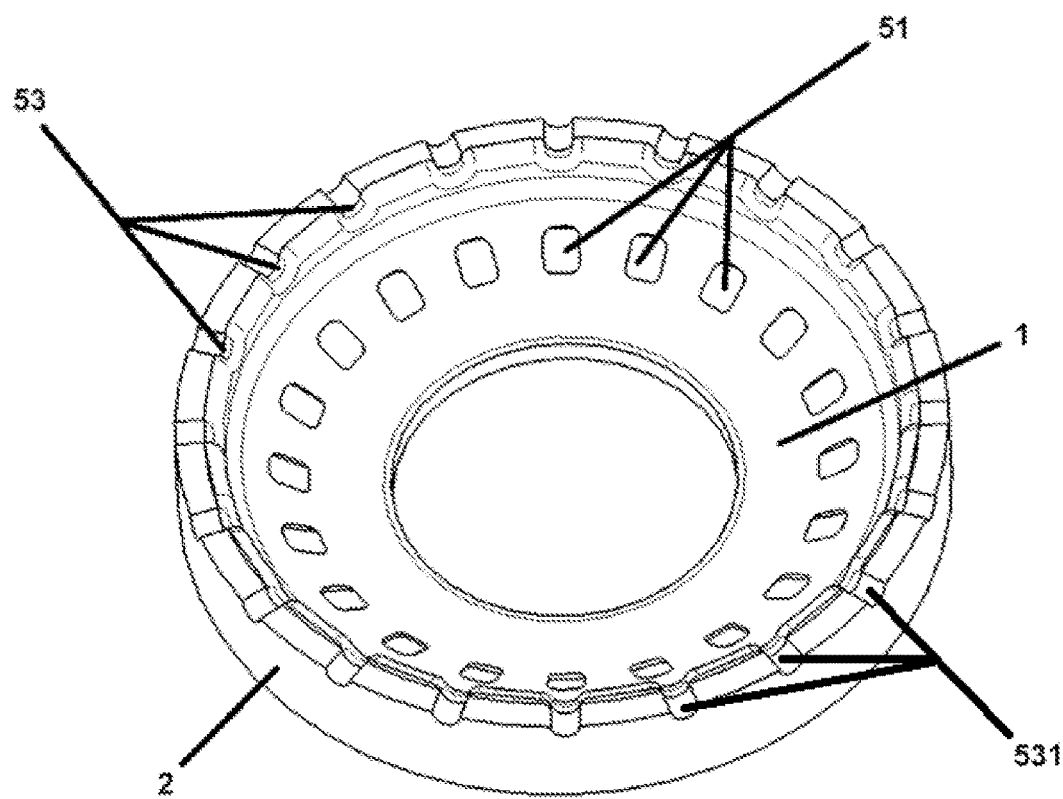

TIRE SUPPORT RIM FOR TRACK ROLLER ASSOCIATED WITH A FLANGE

RELATED APPLICATION

This application claims the benefit of French Patent Application No. 22 01322, filed on Feb. 15, 2022, the entirety of which is incorporated by reference.

FIELD OF THE INVENTION

The present invention relates to the field of mechanisms for track rollers bearing a rolling vehicle flange against a rail, and more particularly, to the field of the heat management systems in such track rollers.

BACKGROUND

In the context of the movement of vehicles guided by rails, and notably in the context of monorail vehicles, the driving involves the friction of a pair of rollers bearing a flange to interact with a guiding rail. These rollers of annular form are configured to pivot axially and press by their flanges against the guiding rail, on either side thereof so as to allow the vehicle to move along the rail. The driving of the vehicle by rotation of the flanges of the rollers thus causes certain parts to heat up by friction in the context of their operation. Thus, on the one hand, the peripheral surface of the tire borne by the roller or mounted on the roller to be in contact against the surface of the rail is subject to heating while the vehicle is moving. Likewise, the various parts of the rolling mechanism of the flange which contribute to the management of its axial pivoting withstand heating as part of the driving and guiding of the vehicle. However, such heating of these rollers, in particular in zones of interaction and of contact with other parts, is likely to lead to phenomena of deformation, for example expansions, of the surfaces concerned. Such deformations impact the quality of the operation of the parts with one another and are also likely to lead to degradations when they affect zones subject to heating which withstand significant stresses.

OBJECTS AND SUMMARY

The aim of the invention is to mitigate these drawbacks by proposing a device that makes it possible to apply a limitation on the heating of a roller and of the corresponding flange, even the cooling thereof, while allowing easier incorporation in such an assembly.

Thus, the subject of the invention is a tire support rim for an annular track roller comprising at least one outer ring of which a prolonged part in the form of a disk on the periphery of the outer ring produces a flange of which the end of the peripheral edge is configured to cooperate with a guiding rail, the rim comprising a substantially circular annular arrangement defining:
  a peripheral edge intended to bear a tire,
  a medial edge intended to be in contact with a medial outer surface of the outer ring of the roller, and
  two opposite faces producing, on the one hand, an open face and, on the other hand, a bearing face configured to be positioned against the surface of the flange of the track roller,
characterized in that the support rim incorporates a cooling device comprising at least one circulation duct for air passing through the thickness of the rim such that the duct comprises at least one orifice positioned on the open face of the rim and a circuit arranged such that, on the one hand, at least a first portion is positioned at the medial edge of the device and, on the other hand, at least a second portion is positioned radially on the bearing face from the medial edge toward the peripheral edge of the rim.

The invention relates also to an assembly comprising a track roller producing a flange associated with a tire support rim according to the invention incorporating a cooling device.

BRIEF DESCRIPTION OF THE DRAWINGS

The invention will be better understood, by virtue of the following description, which relates to preferred embodiments, given as nonlimiting examples, and explained with reference to the attached schematic drawings, in which:

FIG. 1 represents a schematic illustration of a first example of support rim according to the invention by an elevation view on the side of the bearing face of the rim.

FIG. 2 represents a schematic illustration of a first example of support rim according to the invention by an elevation view on the side of the open face of the rim.

FIG. 3 represents a schematic illustration of an assembly associating the first example of support rim according to the invention with a flange by an elevation view on the side of the open face of the rim.

FIG. 4 represents a schematic sectional illustration of an example of support rim according to the invention by a sectional view passing through the axis of rotation of the associated flange.

FIG. 5 represents a schematic illustration of a second example of support rim according to the invention by an elevation view on the side of the open face of the rim.

FIG. 6 represents a schematic illustration of a second example of support rim according to the invention by an elevation view on the side of the bearing face of the rim.

DETAILED DESCRIPTION

The invention relates to a tire 2 support rim 1 for an annular track roller comprising at least one outer ring 31 of which a prolonged part in the form of a disk on the periphery of the outer ring 31 produces a flange 4 of which the end of the peripheral edge is configured to cooperate with a guiding rail, the rim 1 comprising a substantially circular annular arrangement defining:
  a peripheral edge 12 intended to bear a tire 2,
  a medial edge 13 intended to be in contact with a medial outer surface of the outer ring 31 of the roller, and
  two opposite faces producing, on the one hand, an open face 11 and, on the other hand, a bearing face 14 configured to be positioned against the surface of the flange 4 of the track roller,
characterized in that the support rim 1 incorporates a cooling device 5 comprising at least one circulation duct 52 for air passing through the thickness of the rim 1 such that the duct 52 comprises at least one orifice 51 positioned on the open face 11 of the rim 1 and a circuit arranged such that, on the one hand, at least a first portion 521 is positioned at the medial edge 13 of the device 5 and, on the other hand, at least a second portion 522 is positioned radially on the bearing face 14 from the medial edge 13 toward the peripheral edge 12 of the rim 1.

The rim 1 according to the invention is thus configured so as to incorporate an air circulation duct 52 inside which the movement of the air produces a means for recovering and discharging heat which is dissipated from the surfaces subject to heating toward the interior of the rim 1. The circuit of the duct 52 is thus arranged to provide a flow of air in the thickness of the rim 1, such that this flow of air moves as close as possible to the parts of the rim 1 subject to heating, that is to say parts of the rim 1 in contact or likely to be in contact with the portions of the track roller and/or of the tire 2 subject to heating. Thus, the moving flow of air inside the circulation duct 52 circulates through a first portion 521 at the medial edge 13 of the rim 1, so as to be positioned in proximity to an outer surface of the outer ring 31 of the roller positioned in proximity to the axis of rotation of the roller, to be as close as possible to the rolling mechanism 3 of the roller which withstands significant heating in the context of its axial rotation. Likewise, the moving flow of air circulates in a second portion 522 positioned radially on the bearing face 14 from the medial edge 13 toward the peripheral edge 12 of the rim 1 so as to allow a recovery of heat in proximity to the outer or peripheral part of the flange 4 and of the rim 1, at the periphery which bears a tire 2 subject to heating under the effect of its friction and of its rolling against the surface of a rail. It should also be noted that the circulation of the flow of air according to a radial orientation over at least a part of its travel makes it possible to apply a heat exchange, and therefore a cooling in various portions of the rim 1 in contact with a heating of the outer surface of the outer ring 31 of the roller positioned in proximity to the axis of rotation of the roller and/or the part of the roller which produces the flange 4.

According to an example relating to a construction variant, at least a portion of the duct 52 is produced in the form of an open section intended to be partitioned by at least a part of the medial outer surface of the outer ring 31 of the roller and/or a part of the surface 41 of the flange 4 of the roller. According to this variant, the duct 52 produced in the rim 1 has an arrangement of which the partitioning can be obtained by cooperation with at least a part of the peripheral surface of the roller, that is to say of the outer surface of the outer ring 31 of the roller positioned in proximity to the axis of rotation of the roller and/or the part of the roller which produces the flange 4. Such a duct 52 therefore allows easier construction of the rim 1 which incorporates this duct 52. Indeed, the rim 1 is then able to be produced by molding without a drilling operation through the rim 1 being necessary to construct all of the duct 52. The partitioning of the duct 52 is achieved through the positioning and the mounting of the rim 1 on the outer surface of the outer ring 31 of the roller and/or of the surface of the flange 4 of the roller. It should also be noted that such a construction of the duct 52 makes it possible to produce a circulation of the flow of air in the rim 1 such that the heat exchange, and therefore the cooling, is optimized by being performed as close as possible to the various surfaces and parts subject to heating, notably in the roller. Indeed, the flow of air circulating inside the rim 1 moves directly in contact with one or more of the surfaces and parts subject to heating. Since the duct 52 is produced by the shape combination and cooperation, on the one hand, of the medial edge 13 and of the bearing surface 14 and, on the other hand, of the outer surface of the rollers, in portions of the duct 52 for a heat exchange, the direct contact of the moving flow of air against surfaces of parts subject to heating without the presence of any thickness of rim 1 makes it possible to optimize the heat exchange quality.

According to an example relating to another construction variant that can be combined with the construction variants previously mentioned, the duct 52 comprises a second orifice 53 positioned at a distance from the pivoting axis of the rim 1 which is different from the distance separating, on the one hand, the orifice 51 positioned on the open face 11 of the rim 1 and, on the other hand, the pivoting axis of the rim 1. This particular arrangement of the position of the orifices 51, 53 of the duct 52 relative to each other produces an offset of radial position between the first orifice 50 and the second orifice 53 in the plane of pivoting of the rim 1. Such a position offset between the two orifices 51, 53 makes it possible, in operation by axial rotation of the rim 1 with the roller, to generate a greater centrifugal force at the orifice furthest away from the pivoting axis of the rim 1, such that the air inside the duct 52 is naturally, on the one hand, expelled at the orifice of the duct 52 furthest away from the pivoting axis of the rim 1 and, on the other hand, by pressure difference, sucked into the orifice of the duct 52 closest to the pivoting axis of the rim 1. This arrangement thus makes it possible to produce a circulation of air inside the duct 52 without requiring the incorporation of a motor dedicated to moving the air in the duct 52. As an example of construction, the first orifice 51 of the duct 52 emerging on the open face 11 of the rim 1 is positioned closer to the pivoting axis of the rim 1 than a second orifice 53. Thus, the flow of air inside the duct 52 of the cooling device 5 produces a movement from this first orifice 51 of the duct 52 to a second orifice 53. This construction thus makes it possible to achieve a circulation of the flow of air such that the cooler air circulates primarily in the first portion 521 of the duct 52, that is to say in proximity to and/or against a portion of the surface of the outer ring 31 of the roller closest to the rolling mechanism 3, before circulating in the second portion 522 of the duct, that is to say in proximity to and/or against the surface 41 borne by the flange 4 of the roller.

According to an example relating to another construction variant that can be combined with the construction variants previously mentioned, the duct 52 in the second portion 522 of its circuit has at least one section that is greater than in the first portion 521 of its circuit. This difference in section between the various portions of the duct 52 makes it possible to apply an adjustment of the speed of movement of the flow of air inside the circuit. Indeed, the flow of air has a greater speed of movement in portions of the duct 52 of smaller section. Thus, in the first portion 521 of the duct 52 positioned at the surface of the outer ring 31 of the roller closest to the rolling mechanism 3, the flow of air has a greater circulation speed. The difference in temperatures between the moving flow of air and the surfaces subject to heating is thus maintained with a constant difference, such that the continuous flow of air allows an optimized heat exchange on the surfaces of the roller subject to heating. Moreover, the section in the second portion 522 of the duct 52 has a greater dimensioning so as to apply a heat exchange in a greater volume inside the rim 1. Indeed, this second portion 522 is arranged to be disposed at the surface 41 of the flange 4 of the roller according to a substantially radial orientation. Preferably, this second portion 522 is configured such that a part of the surface of the duct 52 is also positioned in the thickness of the rim 1 so as to be situated in proximity to the open face 11 of the rim 1, even at an end situated in proximity to at least a part of the peripheral edge 12 of the rim 1. This arrangement thus allows, in addition to a recovery of heat in at least a part of the flange 4, a heat exchange with the peripheral edge 12 of the rim 1 in contact with the tire 2 subject to heating. Likewise, the moving flow of air in this second portion 522 of the duct 52 can apply a caloric exchange in the form of a release of heat in the portion of the duct 52 positioned in proximity to the open face 11 of the rim 1, this open face 11 being in contact with the outside of the rim 1, it then naturally produces one of the least hot surfaces of the rim 1 when the vehicle is in operation. A release of heat on this outer surface that the open face 11 of the rim 1 produces is thus facilitated thereby.

According to an example relating to a specific construction variant of the construction variant previously mentioned, at least a part of the second portion 522 of the circuit of the duct 52 has a section of which at least one width is at least greater than a thickness of the rim 1. According to this construction variant, when the second portion 522 of the duct 52 is produced by a complementary interaction between, on the one hand, the rim 1 and, on the other hand, a part of the surface 41 of the flange 4 of the roller, the rim 1 bearing against the flange 4 has a thinner thickness according to certain sections of its structure. This thinning of the thickness is notably observed in a plane parallel to the axis of rotation of the roller and therefore of the flange 4 thereof, such that most of the height of the rim 1 is produced by a volume corresponding to the duct 52 in direct interaction with the surface 41 of the flange 4 of the roller.

According to an example relating to another construction variant that can be combined with the construction variants previously mentioned, the duct 52 comprises at least one second orifice 53 positioned at the peripheral edge 12 of the rim 1. The positioning of a second orifice 53 of the duct 52 at the peripheral end of the rim 1 makes it possible to apply an optimized extraction of the air by centrifugal force. Likewise, this positioning makes it possible to apply a heat exchange in the portion of the rim 1 intended to bear the tire 2. Moreover, when the rim 1 is associated with a tire 2, this tire 2 is likely to have a height which is less than the height of the peripheral edge 12 of the rim 1 so as not to block the orifice 53 of the duct 52 at the peripheral end of the rim 1, this orifice 53 being positioned at an end of the peripheral edge 12 of the rim 1 which is located in proximity to the open face 11 or the bearing face 14 of the rim 1. Alternatively, the tire 2 can also comprise a through-orifice 531 arranged so as to be positioned in the extension of the second orifice 53 of the duct 52 incorporated in the rim 1. This through-orifice 531 of the tire 2 thus also contributes to the optimization of the heat exchanges with the tire 2 so as to limit the heating thereof, even allow the cooling thereof. According to an example corresponding to a specific construction variant, this through-orifice 531 is produced by a void produced on the surface of the tire 2 intended to bear against the flange 4 of the roller, such that the through-orifice 531 is produced by the cooperation of the tire 2 with the surface 41 of the flange 4. As a complementary example, the tire 2 can also be composed of a substantially porous material in a portion of its surface positioned level with the second orifice 53 of the duct 52 incorporated in the rim 1. This porosity of the tire 2 thus allows a permeability which authorizes a movement of the flow of air through the tire 2 to allow the circulation of a cooling flow inside the duct 52 of the rim 1.

According to an example relating to another construction variant that can be combined with one or other of the construction variants previously mentioned, the duct 52 comprises a second orifice 53 and/or at least one additional orifice positioned on the face 14 of the rim 1 bearing against the surface 41 of the flange 4. This orifice of the duct 52 positioned on the surface 41 of the flange 4 is intended to be opposite an orifice borne by the surface 41 of the flange 4 and corresponding to an end of a duct disposed through the thickness of the flange 4 of the roller. So, the flow of air circulating in the duct 52 of the rim 1 passes also through the thickness of the flange 4, prior to or after its movement inside the duct 52, and contributes to the cooling of the flange 4 of the roller.

It should be noted that, in the context of the production of the cooling device 5, the duct 52 can comprise one or more air intake orifices and one or more air discharge orifices. Indeed, the duct 52 can have a branching of the circulation of the flow of air at each of its ends.

According to an example relating to another construction variant that can be combined with the construction variants previously mentioned, the open face 11 comprises at least one relief 6 producing a radially oriented fin 61. The open face 11 of the rim 1 thus has an arrangement which, in the context of its axial rotation with the track roller, is able to generate turbulences on the surface of the rim 1. The at least one fin 621 produced by this surface relief, by being oriented radially on the open face 11 of the rim 1, makes it possible to optimize the stirring and the ventilation of the air present on the surface of the rim 1. These air movements on the surface 11 of the rim 1 facilitate the suction of cool air at the first orifice 51 of the duct 52 and contribute also to the renewal of the air on the open face 11 of the rim 1. Moreover, the at least one fin 61 on the surface 11 of the rim 1 can be arranged so as to direct the flow of air on the open face 11 of the rim 1 toward the first orifice 51 of the duct 52. According to an exemplary embodiment, the fin 61 can involve a protruding relief 6 combined with one or more reliefs 6 produced in the form of voids 62 positioned on either side of this protruding relief. Such an arrangement makes it possible to optimize the stirring surface of the fin 61 without requiring an increase of thickness of the rim 1. The fin 61 can thus apply an effective stirring of air on the surface of the rim 1 without extending beyond the height of the rim 1. According to an example corresponding to a specific construction variant, the relief 6 formed on the surface of the open face 11 of the rim 1 is disposed so as to be positioned in proximity to one of the faces of the duct 52 in the thickness of the rim 1 by at least partly closely following the form of a portion of the surface of the duct 52. So, in a sectional plane parallel to the axis of rotation of the rim 1 with the track roller, the relief 6 which produces a fin 61 on the surface 11 of the rim 1 closely follows, at least partly, the form of the duct 52 produced by the rim 1. When the rim 1 comprises a cooling device 5 produced in the form of several respective ducts 52, each duct 52 can be associated with a respective fin 61 which produces a protuberance on the open face 11 of the rim 1 and between which the open face 11 of the rim 1 comprises at least one void 62. According to an example corresponding to another specific construction variant that can be combined with the preceding specific variant, the open face 11 of the rim 1 comprises a plurality of fins 61 disposed radially. This plurality of fins 61 makes it possible to produce an open face 11 of the rim 1 which bears a turbulence mechanism allowing an effective renewal of the air in contact with the rim 1 as soon as it is rotated in the context of operation, on the one hand, of the flange 4 of the roller interacting with the rail and, on the other hand, of the tire 2, such that the heat which appears on these various parts and surfaces can be effectively discharged.

According to an example relating to another construction variant that can be combined with the construction variants previously mentioned, the open face 11 of the rim 1 comprises at least one relief 6 producing a void 62 in the thickness of the rim 1, in proximity to the peripheral edge 12. This particular construction, notably when it is combined with the presence of a protruding relief 6 which contributes to the production of at least one fin 61, allows the positioning, on the face 11 of the rim 1, of means that can contribute to the generation of turbulences and of air movement in the part of the rim 1 which undergoes the longest travel and therefore has the greatest speed of movement. So, by being positioned at the most peripheral part of the open face 11 of the rim 1, the relief 6 produced by this at least one void 61 makes it possible to maximize the generation of turbulences on the surface of the rim 1. This relief 6 also makes it possible to increase the heat exchange surfaces of the rim 1 and therefore increase the effectiveness of the cooling.

According to an example relating to another construction variant that can be combined with the construction variants previously mentioned, the cooling device 5 comprises a plurality of ducts 52 disposed radially in the annular arrangement of the rim 1. This particular arrangement of the various ducts 52 which form the cooling device 5 allows a heat exchange and a heat discharge, on the one hand, on the surface of the outer ring 31 of the roller closest to the rolling mechanism 3 and, on the other hand, on the surface 41 of the flange 4 of the roller associated with the rim 1, but also on all of the annular structure of the tire 2 which surrounds the rim 1. Moreover, this radial distribution of ducts 52 of the cooling device 5 can also be coupled with an arrangement of several fins 61 disposed radially on the open face 11 of the rim 1.

The invention relates also to an assembly comprising a track roller producing a flange 4 associated with a tire 2 support rim 1 according to the invention. The tire 2 support rim 1 then incorporates a cooling device 5 as detailed previously.

Obviously, the invention is not limited to the embodiments described and represented in the attached drawings. Modifications remain possible, notably from the point of view of the composition of the various elements or by substituting technical equivalents, without in any way departing from the scope of protection of the invention.

The invention claimed is:

1. A tire support rim for an annular track roller having at least one outer ring of which a prolonged part in the form of a disk on the periphery of the outer ring produces a flange of which the end of the peripheral edge is configured to cooperate with a guiding rail, the rim comprising: a substantially circular annular arrangement defining: a peripheral edge intended to bear a tire, a medial edge intended to be in contact with a medial outer surface of the outer ring of the roller, and two opposite faces forming on one side an open face and, on another side, a bearing face configured to be positioned against the surface of the flange of the track roller, wherein the support rim incorporates a cooling device comprising at least one circulation duct for air passing through the thickness of the rim such that the duct comprises at least one orifice positioned on the open face of the rim (1) and a circuit arranged such that, on the one hand, at least a first portion is positioned at the medial edge of the device and, on the other hand, at least a second portion is positioned radially on the bearing face from the medial edge toward the peripheral edge of the rim.

2. The rim as claimed in claim 1, wherein at least a portion of the duct is produced in the form of an open section intended to be partitioned by at least a part of the medial outer surface of the outer ring of the roller and/or a part of the surface of the flange of the roller.

3. The rim as claimed in claim 1, wherein the duct comprises a second orifice positioned at a distance from the pivoting axis of the rim this distance being different from the distance separating the orifice positioned on the open face of the rim and, different from the distance separating the pivoting axis of the rim.

4. The rim as claimed in claim 1, wherein the circuit of the duct is arranged so that one part of its in the second portion comprises a larger section than its first portion.

5. The rim as claimed in claim 4, wherein at least a part of the second portion of the circuit of the duct has a section of which at least one width is at least greater than a thickness of the rim.

6. The rim as claimed in claim 1, wherein the duct comprises at least one second orifice positioned at the peripheral edge of the rim.

7. The rim as claimed in claim 1, wherein the duct comprises a second orifice and/or at least one additional orifice positioned on the face of the rim bearing against the surface of the flange.

8. The rim as claimed in claim 1, wherein the open face comprises at least one relief producing a radially oriented fin.

9. The rim as claimed in claim 1, wherein the open face comprises at least one relief producing a void in the thickness of the rim, in proximity to the peripheral edge.

10. The rim as claimed in claim 1, wherein the cooling device comprises a plurality of ducts disposed radially in the annular arrangement of the rim.

11. An assembly comprising: the annular track roller producing flange associated with the tire support rim as claimed in claim 1.

* * * * *